(12) United States Patent
Morein et al.

(10) Patent No.: US 9,436,325 B2
(45) Date of Patent: Sep. 6, 2016

(54) ACTIVE PEN FOR MATRIX SENSOR

(71) Applicant: Synaptics Incorporated, San Jose, CA (US)

(72) Inventors: Stephen L. Morein, San Jose, CA (US); Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 83 days.

(21) Appl. No.: 14/137,463

(22) Filed: Dec. 20, 2013

(65) Prior Publication Data

US 2015/0177868 A1 Jun. 25, 2015

(51) Int. Cl.
*G06F 3/044* (2006.01)
*G06F 3/0354* (2013.01)
*G06F 3/041* (2006.01)

(52) U.S. Cl.
CPC ........... *G06F 3/044* (2013.01); *G06F 3/03545* (2013.01); *G06F 3/0416* (2013.01); *G06F 2203/04104* (2013.01)

(58) Field of Classification Search
None
See application file for complete search history.

(56) References Cited

U.S. PATENT DOCUMENTS

| | | | |
|---|---|---|---|
| 8,482,536 B1 * | 7/2013 | Young | 345/173 |
| 2012/0050216 A1 * | 3/2012 | Kremin et al. | 345/174 |
| 2012/0154340 A1 | 6/2012 | Vuppu et al. | |
| 2012/0327041 A1 | 12/2012 | Harley et al. | |
| 2013/0321296 A1 | 12/2013 | Lee et al. | |
| 2014/0028634 A1 * | 1/2014 | Krah et al. | 345/179 |
| 2014/0184554 A1 * | 7/2014 | Walley | 345/174 |

* cited by examiner

*Primary Examiner* — Kent Chang
*Assistant Examiner* — Nathan Brittingham
(74) *Attorney, Agent, or Firm* — Patterson + Sheridan, LLP

(57) ABSTRACT

A capacitive sensing device detects the presence of an actively modulated input object, such as an active pen, using a matrix of sensor electrodes. The capacitive sensing device include receiver channels configured to perform capacitive sensing of the active pen based on one frequency, and other receiver channels configured to perform capacitive sensing of other input objects based on another frequency. The receiver channels for sensing the active pen may be multiplexed across the matrix of sensor electrodes to track the location of the active pen in a tracking window manner. The receiver channels for sensing the active pen may also be multiplexed across the matrix of sensor electrodes to broadly search for the location of the active pen.

20 Claims, 10 Drawing Sheets

ACTIVE PEN FOR MATRIX SENSOR

BACKGROUND OF INVENTION

1. Field of the Invention

Embodiments of the present disclosure generally relate to a method and apparatus for input sensing, and more specifically, a capacitive input sensing device for sensing an actively modulated input object, and methods for using the same.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE INVENTION

Embodiments described herein include an input device having a capacitive sensing device, a processing system and a method for detecting presence of an input object using the capacitive sensing device, all of which include a plurality of sensor electrodes arranged in a matrix. Each sensor electrode may include one or more common electrodes that are configured for both input sensing and display updating.

In one embodiment, the input device includes a plurality of sensor electrodes organized into a plurality of sets, and a processing system. The processing system is configured to drive the plurality of sensor electrodes with modulated signals having a first frequency. The processing system includes a first plurality of receivers coupled to the plurality of sensor electrodes and a second plurality of receivers. The first plurality of receivers is configured to obtain first resulting signals comprising effects corresponding to the modulated signals. Each receiver of the second plurality of receivers is coupled to an associated set of the plurality of sensor electrodes and configured to obtain second resulting signals comprising effects corresponding to active signals having a second frequency. The processing system is configured to demodulate the first resulting signals based on the first frequency of the modulated signals and the second resulting signals based on the second frequency. The second frequency is different than the first frequency.

In another embodiment, a processing system is provided that is configured to drive a capacitive sensing device having a plurality of sensor electrodes organized into a plurality of sets. The processing system includes a sensor module configured to drive the plurality of sensor electrodes with modulated signals having a first frequency. The sensor module includes a first receiver coupled to at least one sensor electrode of the plurality of sensor electrodes. The first receiver is configured to obtain first resulting signals comprising effects corresponding to the modulated signals. The sensor module further includes a second receiver coupled to an associated set of the plurality of sensor electrodes. The second receiver is configured to obtain second resulting signals comprising effects corresponding to active signals having a second frequency. The sensor module is further configured to demodulate the first resulting signals based on the first frequency of the modulated signals and demodulate the second resulting signals based on the second frequency. The second frequency is different than the first frequency.

According to one embodiment, a method is provided for detecting presence of an input object using a capacitive sensing device that includes a plurality of sensor electrodes organized in a plurality of sets. The method includes driving the plurality of sensor electrodes with modulated signals having a first frequency, and receiving first resulting signals at a first receiver comprising effects corresponding to the modulated signals. The method further includes receiving second resulting signals at a second receiver comprising effects corresponding to active signals having a second frequency. The method includes demodulating the first resulting signals based on the first frequency of the modulated signals and the second resulting signals based on the second frequency. The second frequency is different than the first frequency.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
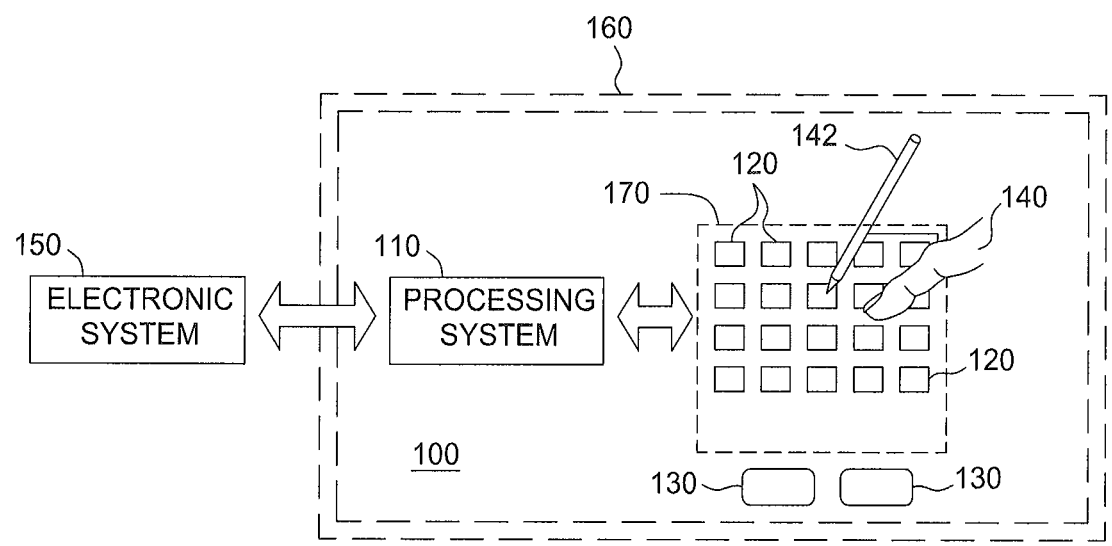
FIG. 1 is a schematic block diagram of an input device integrated into an exemplary display device, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Various embodiments of the present technology provide input devices and methods for improving usability. Specifically, an electrode matrix that is used for capacitive sensing may be integrated into a display panel of an input device. In one embodiment, source drivers may be mounted on the display panel and which drive the display signals and capacitive sensing signals into the display panel. In one embodiment, the source drivers may include a number of receiver channels dedicated to performing capacitive sensing of an actively modulated input object, such as an "active pen".

FIG. 1 is a schematic block diagram of an input device 100 integrated into an exemplary display device 160, in accordance with embodiments of the present technology. Although the illustrated embodiments of the present disclosure are shown integrated with a display device, it is contemplated that the invention may be embodied in the input devices that are not integrated with display devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system 150. As appropriate, the input device 100 may communicate with parts of the electronic system 150 using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140, 142 in a sensing region 170. Example input objects 140 include fingers and styli, as shown in FIG. 1.

In one embodiment, the input object may be an actively modulated device (e.g. an active pen 142) having a transmitter which is configured to transmit an active signal, referred to herein as an active pen signal, across a capacitance between the active pen 142 and one or more sensor electrodes 120 of the input device 100. The sensor electrodes 120 are configured to receive the active pen signal and to determine (e.g., via receivers, described later) the position of the active pen 142 based on which sensor electrodes received the signal. In some embodiments, the transmitter of the active pen 142 may be located at a tip or distal end of the active pen, although other locations may be used. The active pen 142 may be coupled, or "tethered," to the input device 100 or, in other embodiments, may be un-tethered to the input device 100. In one embodiment, the active pen signal may be generated by a crystal oscillator inside the active pen 142, although other mechanisms for generating signals may be used. The active pen signal may have waveform parameters (e.g., frequency, amplitude, phase, etc.) which are predetermined and known by the input device 100 that is configured to listen for the active pen signal. In some embodiments, the active pen 142 may select from a set of frequencies for the active pen signal to avoid noise, for example, by moving to another frequency for the active pen signal if one frequency is deemed "noisy." This shift in active pen frequency may be initiated by the active pen 142, or in other embodiments, by the input device 100. In some embodiments, the active pen 142 may be communicatively coupled (e.g., via wire, or wirelessly) with the input device 100 for coordinating characteristics of the active pen signal (e.g., frequency), providing power, and other purposes. Furthermore, different parameters of the active pen signal (e.g., additional frequencies and amplitudes) may be used by the input device 100 to determine corresponding different states of the active pen 142, such as states corresponding to different colors, brush sizes/widths, and tools (e.g., pencil, eraser).

In one embodiment, a capacitive between the input device 100 and earth ground, and an external impedance, e.g., a capacitance, between the active pen 142 and earth ground provide a closed alternating current (AC) circuit. Via this closed AC circuit, the active pen 142 is capacitively coupled to the input device 100 through coupling capacitance, and the active pen signal is transmitted to the input device 100.

In one embodiment, an angle of the active pen 142 in relation to the surface of the input device 100 can be determined. In one embodiment, the active pen 142 has a second transmitter located a distance away from the tip of the active pen such that a distance from a middle location (e.g., shaft) or other distal end of the active pen 142 may be determined. The second transmitter may be able to transmit a second active pen signal at either a second active pen frequency different from the active pen signal frequency of the first transmitter. Further, the two transmitters may transmit at the same frequency but use a coding technique, such that when the resulting signal received by the sensor module is demodulated based on the code, the position for each transmitter (e.g., one along the tip of the active pen and one along the shaft of the active pen) may be determined. As such, knowing the location of the first and second transmitters allows the angle of the pen to be determined. Further, active pen signals having the second active pen frequency may be received using another separate type of receiver specifically configured for the second active pen frequency or, in other embodiments, use a receiver that is time multiplexed between the two active pen frequencies. In some embodiments, the active pen 142 may include an additional transmitter configured to transmit at a different frequency that could be used for other features such as an "active pen eraser", different sized pen tip, etc.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing electrodes 120 for detecting user input. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing electrodes 120 to create electric fields. In some capacitive implementations, separate sensing electrodes 120 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit a transmitter signal. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes 120 may be dedicated transmitter electrodes or receiver electrodes, or may be configured to both transmit and receive. In some implementations user input from an actively modulated device (e.g. an active pen) may act as a transmitter such that each of the sensor electrodes acts as a receiver to determine the position of the actively modulated device.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing electrodes 120 of the input device 100. In other embodiments, components of processing system 110 are physically separate with one or more components close to sensing electrodes 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing electrodes 120 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing electrodes 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensing electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
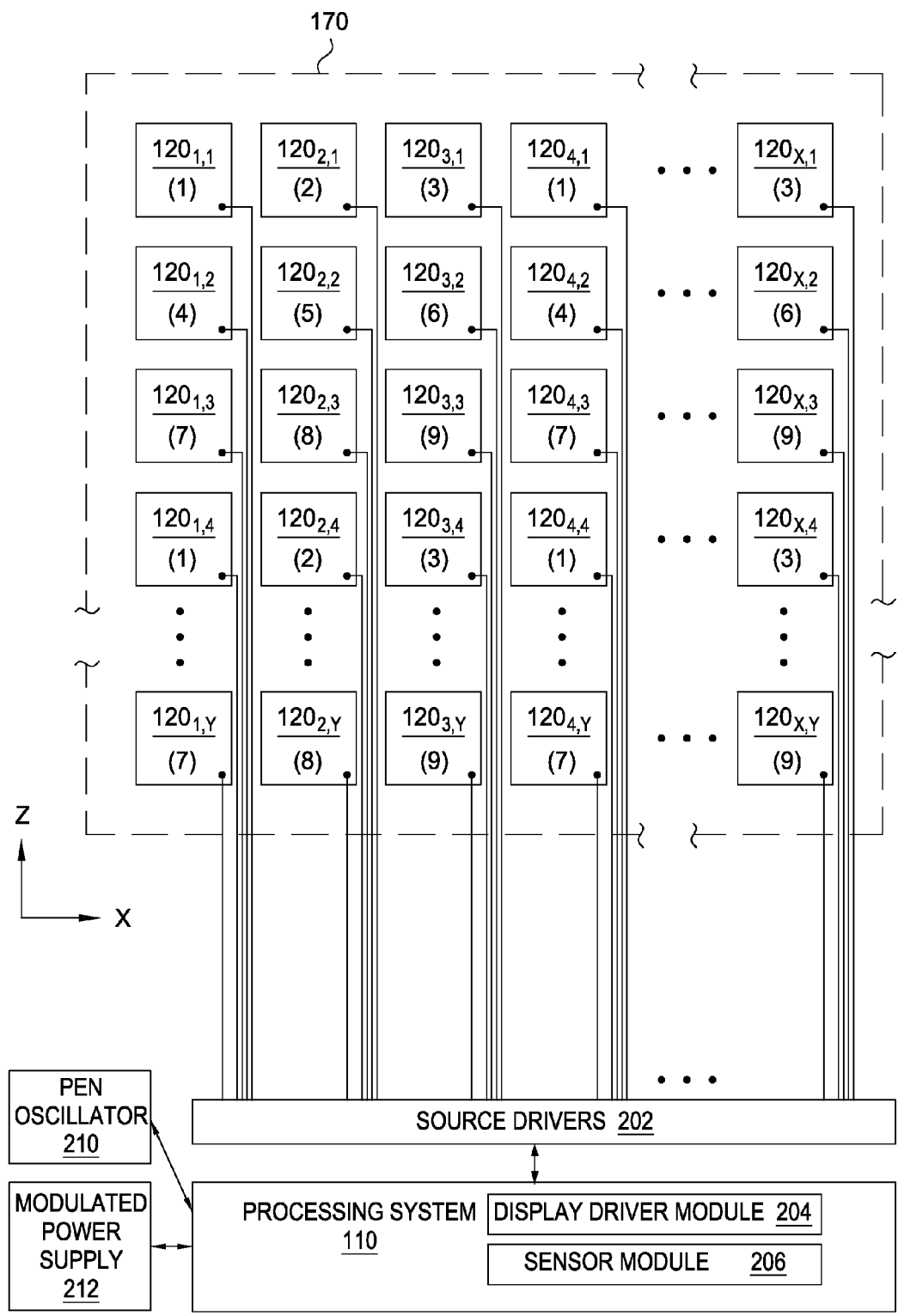
FIG. 2 illustrates a simplified exemplary array of sensor elements that may be used in the input device of FIG. 1, according to one embodiment described herein.

FIG. 2 shows a portion of an exemplary pattern of sensing electrodes 120 configured to sense in the sensing region 170 associated with the pattern, according to some embodiments. For clarity of illustration and description, FIG. 2 shows the sensor electrodes 120 in a pattern of simple rectangles and does not show various other components. The exemplary pattern comprises an array of sensor electrodes $120_{X,Y}$ (referred collectively as sensor electrodes 120) arranged in X columns and Y rows, wherein X and Y are positive integers, although one of X and Y may be zero. While the sensor electrodes 120 are depicted as being arranged in a matrix, it is contemplated that the pattern of sensing electrodes 120 may comprises a plurality of sensor electrodes 120 having other configurations, such as polar arrays, repeating patterns, non-repeating patterns, a single row or column, or other suitable arrangement. The sensor electrodes 120 are coupled to the processing system 110 and utilized to determine the presence (or lack thereof) of an input object 140 in the sensing region 170.

In a first mode of operation, the arrangement of sensor electrodes 120 may be utilized to detect the presence of an input object via absolute sensing techniques. That is, processing system 110 is configured to drive each sensor electrode 120 with a modulated signal and measure a capacitance between the sensor electrode 120 and the input object (e.g., free space or earth ground) based on the modulated signal, which is utilized by the processing system 110 or other processor to determine the position of the input object.

In a second mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

In a third mode of operation, the sensor electrodes 120 may be organized into sets of sensor electrodes utilized to detect the presence of an active pen 142 via techniques similar to absolute sensing techniques described above. In some embodiments, a capacitance between the input device 100 and earth ground, and an external impedance between the active pen 142 and earth ground (e.g., human hand) may provide a closed alternating current (AC) circuit. Via this closed AC circuit, the active pen 142 is electrically coupled to the input device 100 through coupling capacitance. The active pen 142 is configured to transmit an active pen signal onto one or more sensor electrodes 120 in proximity to the active pen 142, effectively transmitting a charge to a sensor electrode 120 through the capacitive coupling between the active pen 142 and the input device 100. The processing system 110 is configured to obtain resulting signals from the one or more sensor electrodes 120 that comprise effects corresponding to the active pen signal.

The input device 100 may be configured to operate in any one of the modes described above. The input device 100 may also be configured to operate switch between any two or more of the modes described above. In one embodiment, the input device 100 may be configured to operate in multiple modes within an overlapping time period, for example, by performing capacitance sensing of input objects in the matrix of sensor electrodes while performing sensing of an active pen.

The areas of localized capacitive coupling may be termed "capacitive pixels." Capacitive pixels may be formed between an individual sensor electrode 120 and ground in the first mode of operation and between groups of sensor electrodes 120 used as transmitter and receiver electrodes in the second mode of operation. The capacitive coupling changes with the proximity and motion of input objects 140, 142 in the sensing region 170 associated with the sensing electrodes 120, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit a transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes 120 configured as receiver sensor electrodes may be operated singly or multiply to acquire resulting signals. The resulting signals may be used to determine measurements of the capacitive couplings at the capacitive pixels.

In other embodiments, "scanning" sensor electrodes 120 to determine these capacitive coupling comprises driven one or more of the sensor electrodes are driven and received with. In another embodiment, the sensor electrodes may be operated such that more than one sensor electrodes is driven and received with at a time, or sensor electrodes are driven and received with at the same time. In such embodiments, an absolute capacitive measurement may be obtained from each of the one or more sensor electrodes 120 simultaneously. In one embodiment, the input device 100 simultaneously drives a plurality of the sensor electrodes 120 and measures an absolute capacitive measurement for each of the driven sensor electrodes 120 in the same touch cycle. In various embodiments, processing system 110 may configured to selectively drive and receive with a portion of sensor electrodes 120. For example, the sensor electrodes may be selected based on, but not limited to, an application running on the host processor, a status of the input device, and an operating mode of the sensing device.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. In one or more embodiment, the display electrodes comprise one or more segments of a Vcom electrode (common electrode), a source drive line, gate line, an anode electrode or cathode electrode, or any other display element. These display electrodes may be disposed on an appropriate display screen substrate. For example, the common electrodes may be disposed on the a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the common electrode can also be referred to as a "combination electrode", since it performs multiple functions. In various embodiments, each of the sensor electrodes 120 comprises one or more display electrodes. In other embodiments, at least two sensor electrodes 120 may share at least one display electrode.

As discussed above, the sensor electrodes 120 may be formed as discrete geometric forms, polygons, bars, pads, lines, or other shape (e.g., circular, rectangular, diamond, star, square), which are ohmically isolated from one another. That is, one or more insulators separate the sensor electrodes 120 and prevent them from electrically shorting to each other. The sensor electrodes 120 may be electrically coupled through circuitry to form electrodes of having larger plan area relative to a discrete one of the sensor electrodes 120. The sensor electrodes 120 may be fabricated from opaque or non-opaque conductive materials. In embodiments wherein the sensor electrodes 120 are utilized with a display device, it may be desirable to utilize non-opaque conductive materials for the sensor electrodes 120. In embodiments wherein the sensor electrodes 120 are not utilized with a display device, it may be desirable to utilize opaque conductive materials having lower resistivity for the sensor electrodes 120 to improve sensor performance. Materials suitable for fabricating the sensor electrodes 120 include ITO, aluminum, silver, copper, and conductive carbon materials, among others. The sensor electrodes 120 may be formed as contiguous body of conductive material having little or no open area (i.e., having a planar surface uninterrupted by holes), or may alternatively be fabricated to form a body of material having openings formed therethrough. For example, the sensor electrodes 120 may be formed a mesh of conductive material, such as a plurality of interconnected thin metal wires. In one embodiment, at least one of the length and width of the sensor electrodes 120 may be in a range of about 1 to about 2 mm. In other embodiments, at least one of the length and width of the sensor electrodes may be less than about 1 mm or greater than about 2 mm. In other embodiment, the length and width may not similar, and one of the length and width may be in the range of about 1 to about 2 mm. Further, on various embodiments, the sensor electrodes 120 may comprise a center to center pitch in the range of about 4 to about 5 mm; however, in other embodiments, the pitch may be less than about 4 mm or greater than about 5 mm.

Continuing to refer to FIG. 2, the processing system 110 coupled to the sensing electrodes 120 includes a sensor module 206, and optionally, a display driver module 204. In one embodiment, the sensor module 206 includes circuitry configured to drive the sensing electrodes 120 with modulated signals, having a first frequency, during periods in which input sensing is desired. The sensor module 206 may be configured to receive (first) resulting signals comprising effects corresponding to the modulated signals, as well as receive (second) resulting signals comprising effects corresponding to active signals (e.g., active pen signals) having a second frequency. The active signals may be transmitted from an input object, such as the active pen 142, which is characterized as "external" to the input device 100, even though the active pen 142 may be tethered to the input device, to distinguish from, for example, sensor electrodes that transmit signals. The modulated signals may be used for absolute capacitive sensing or as a transmitter signal for transcapacitive sensing. The sensor module 206 is configured to demodulate the first and second resulting signals based on the first and second frequencies, respectively. The sensor module is configured to determine first positional information for a first input object 140 (e.g., finger) based on the demodulation of the first resulting signals and second positional information for a second input object (e.g., active pen 142) based on the demodulation of the second resulting signals, The sensor module 206 may be selectively coupled to one or more of the sensor electrodes 120 and operated in any of the sensing modes described herein. For example, the sensor module 206 may be coupled to all the sensor electrodes 120 and operate in an absolute or transcapacitive sensing mode. In another example, the sensor module 206 may be selectively coupled to one or more sensor electrodes 120 at a desired location to define a tracking window for tracking movement and location of the input object in the tracking window. If movement of the input object to a new location is detected, the sensor module 206 is configured to modify the selection of sensor electrodes based on the new location. An example of the tracking window is described later in conjunction with FIG. 9. In yet another example, if the location of the active pen 142 is unknown (for purposes of placing the tracking window), the sensor module 206 may selectively coupled to sensor electrodes 120 to define a search pattern distributed across the sensor electrodes. An example of the search pattern is described later in conjunction with FIG. 10.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes 120 for capacitive sensing during any one or more of or any combination of the non-display update times.

Further, in some embodiments, capacitive sensing of one input object and sensing of another input object using different frequencies may occur during at least partially overlapping periods. For example, the sensor module 206 may include one receiver configured to obtain resulting signals comprising effects corresponding to the active pen 142 transmitting the active signal while another received is obtaining resulting signals comprising effects corresponding to another input object. In other embodiments, capacitive sensing of one input object and capacitive sensing of another input object using different frequencies may be time-multiplexed. For example, the sensor module 206 may include a receiver configured to obtain and demodulate first resulting signals based on the first frequency of the modulated signals during a first capacitive sensing period, and then obtain and demodulate second resulting signals based on the frequency second of the active signals during a second capacitive sensing period.

In one embodiment, the sensor module 206 includes circuitry configured to receive a resulting signal with the sensing electrodes 120 comprising effects corresponding to the transmitter signal during periods in which input sensing is desired. The sensor module 206 may determine a position of the input object 140 in the sensing region 170 or may provide a signal including information indicative of the resulting signal to another module or processor, for example, determination module or a processor of the electronic system 150 (i.e., a host processor), for determining the position of the input object 140 in the sensing region 170.

In one embodiment, the sensor module 206 may include a plurality of receivers coupled to sensor electrodes 120 for measuring changes in capacitance with the sensor electrodes 120. Each receiver may include an analog front end (AFE) channel configured to modulate a corresponding sensor electrode 120 and measure changes in capacitance between the corresponding sensor electrode 120 and an input object. In one embodiment, the receiver channel may include circuitry configured to measure an amount of charge needed to hold a sensor electrode 120 at a particular voltage with respect to a ground signal. Each of the receivers may be selectively coupled to one or more sensor electrodes 120 with selection circuitry such as one or more multiplexers.

In one or more embodiments, a receiver of the sensor module 206 may be associated with a set of sensor electrodes 120 and may be selectively coupled to a sensor electrode in the associated set of sensor electrodes with selection circuitry such as one or more multiplexers. The receivers may be multiplexed with the sensor electrodes 120 according to a sequential pattern, an example of which is shown in FIG. 2. As shown, the sensor electrodes are organized into nine sets, where the set designated for each sensor electrode 120 is depicted with (1), (2), (3), . . . (9) notation, in a pattern repeated across the matrix of sensor electrodes 120. The sensor electrodes 120 are configured such that all sensor electrodes designated in the first set (i.e., "set 1") may be coupled to a multiplexor coupled to a receiver associated with the first set, all sensor electrodes designated in the second set (i.e., "set 2") may be coupled to a multiplexor coupled to another receiver associated with the second set, and so forth. For example, a first set of sensor electrodes is associated with a first receiver and includes at least sensor electrodes $120_{1,1}$, $120_{4,1}$, $120_{1,4}$, $120_{4,4}$, and $120_{X-2,1}$, a second set of sensor electrodes is associated with a second receiver and includes at least sensor electrodes $120_{2,1}$, $120_{2,4}$, etc., and a ninth set of sensor electrodes is associated with a ninth receiver and includes at least sensor electrodes $120_{3,3}$, $120_{X,3}$, $120_{3,Y}$, $120_{X,Y}$. It should be recognized that other patterns for multiplexing sensor electrodes 120 may be used, as well as numbers of different designated sets (e.g., 4 sets) may be utilized.

In one embodiment, one or more receivers may be selectively coupled (e.g., via multiplexing) to a subset of sensor electrodes selected for capacitive sensing of an active pen. In one embodiment, the multiplexors may be controlled such that the receivers are selectively coupled to the sensor electrode 120 closest in proximity to the active pen, as well as neighboring sensor electrodes (e.g., neighboring eight sensor electrodes). As the active pen moves, the receivers are selectively coupled to the sensor electrodes in a "traveling window" fashion to keep a pattern (e.g., 3×3 pattern) of selected sensor electrodes centered on the location of the active pen.

The display driver module 204 may be included in or separate from the processing system 110. The display driver module 204 includes circuitry confirmed to provide display image update information to the display of the display device 160 during non-sensing (e.g., display updating) periods.

In one or more embodiments, the input device 100 further includes a pen frequency oscillator 210 and a modulated power supply 212 which provide modulated reference signals that can be used for capacitive sensing of the input objects 140, 142. In one embodiment, the pen frequency oscillator 210 is configured to generate a modulated reference signal associated with an active signal transmitted by an active pen 142. The pen frequency oscillator 210 may be configured to selectively generate a modulated reference signal from a range of possible reference signals having varying frequencies and other characteristics to match the frequency used by the active pen 142. In some embodiments, the pen frequency oscillator 210 may selectively generate a modulated reference having a particular frequency based on control signals received by another module, for example, by a module of the processing system 110. In such embodiments, the pen frequency oscillator 210 is controlled (e.g., via control signals from the processing system 110) to handle situations of frequency drift of the active pen signal transmitted by the active pen 142, as well as to allow compatibility with a wide array of active pens that may transmit a range of transmitter signals with different frequencies, phase, and amplitudes. For example, the pen frequency oscillator 210 may be configured to provide a signal having a range of ±10% of a predetermined frequency, e.g., which may be specified by a manufacturer or provider of the active pen 142.

In one embodiment, the modulated power supply 212 is configured to generate modulated power supply signals and a modulated ground signal provided to display elements and input sensing elements within the input device 100. The modulated power supply signals and modulated ground signal cause the various components of the input device 100 described above that would normally be held at a substantially constant voltage with respect to earth ground to instead be driven with a modulated signal with respect to earth ground. In other words, by powering the input device 100 with a modulated power supply, all signals in the input device 100 are modulated. The sensor electrodes 120 can then be operated simply by maintaining the sensor electrodes 120 at a constant voltage with respect to the modulated ground signal. Since the input object 140 is (generally) at earth ground, the voltage differential between the sensor electrodes 120 and the input object 140 varies with time.

Dual-Gate Line Routing

Figure 3:
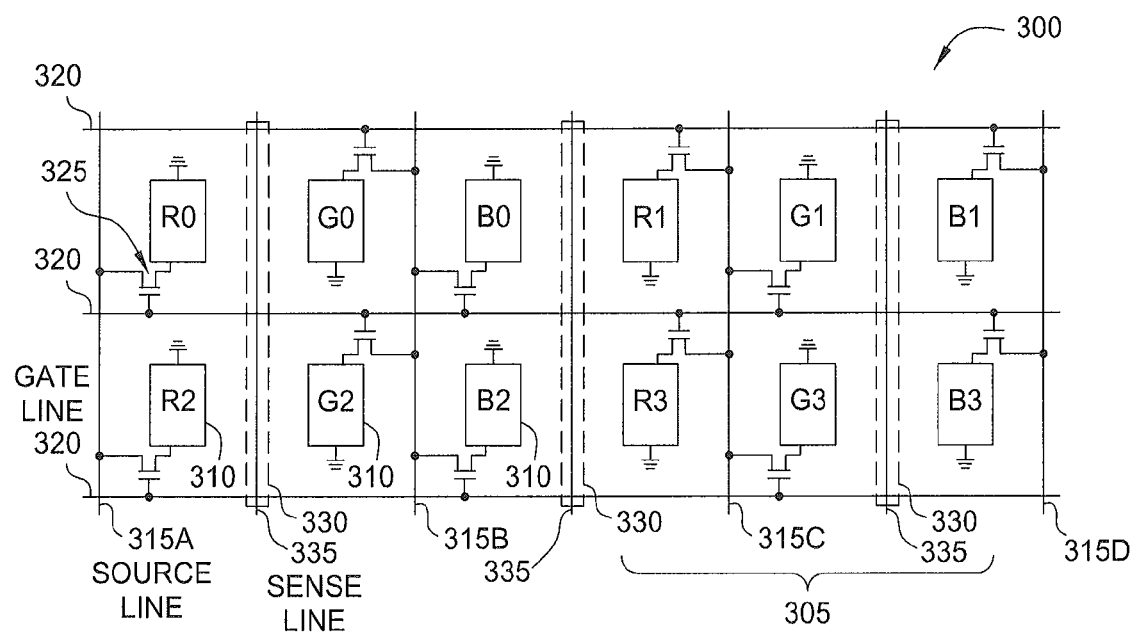
FIG. 3 illustrates a display device that shares a source line between two sub-pixels, according to one embodiment described herein.

FIG. 3 illustrates a display device 300 where two sub-pixels 310 share the same source line 315. As used herein, a pixel 305 is a combination of monochromatic sub-pixels 310 (e.g., red, green and blue) that are combined to define the combined color of the pixel 305. Thus, as shown, the display device 300 includes four pixels 305 that each include three sub-pixels 310. To change the color of the sub-pixels 310, and thus, change the color of the pixel 305, the device 300 includes gate lines 320 which are used to activate one or more of the sub-pixels 310 in a particular row in the device 300. For example, the display device 300 may activate one of the gate lines 320 at a time (e.g., sequentially) which activates the switching elements 325 (e.g., transistors) in the row. In parallel, the device 300 may drive the desired voltage for the sub-pixels 310 onto the source lines 315. While the sub-pixels are shown coupled to ground, any reference voltage (e.g., Vcom) may be used to set the voltage across the sub-pixels 310. Because the other gate lines 320 deactivate the switching elements 325 they are coupled to, the voltages on the source lines 315 do not affect the sub-pixels 310 coupled to the deactivated switches 325.

In device 300, some or all of the source lines 315 are used to set the voltage on at least two sub-pixels 310 on the same row. For example, source line 315B sets the voltage on sub-pixel G0 and B0. To do so, the display device 300 may drive the source lines 315 twice as fast in order to update a row in the same amount of time needed if the source lines 315 were not shared by sub-pixels 310 in the same row. This technique is referred to herein as a dual-gate arrangement where two gates lines 320 are used in order to activate every sub-pixel 310 in a row. During the first half of a display row update, a first gate line 320 activates every other switching element 325 in the row to update the corresponding sub-pixels 310 (e.g., sub-pixels G0, R1 and B1 are electrically coupled to the sources lines 315B, 315C, and 315D). During the second half of the display row update, a second gate line 320 activates the other half of the switching elements 325 in the row to update the rest of the sub-pixels 310 (e.g., sub-pixels R0, B0, and G1 are electrically coupled to the sources lines 315A, 315B, and 315C). In this manner, the gate lines 320 and source lines 315 may be synchronized to ensure the correct voltages are driven onto the sub-pixels 310. Although the dual-gate arrangement may drive the source and gate lines 315, 320 twice as fast in order to maintain the same display rate, the number of source line drivers is halved.

Reducing the number of source lines 315 using the dual-gate arrangement frees up the routing channels 330. That is, if the dual-gate arrangement was not used, these routing channels 330 would be occupied by source lines 315. Instead, the display device 300 may place conductive routing traces 335 in the routing channels 330. As will be discussed later, the display device 300 may include a plurality of different layers. That is, the pixels 305, gate lines 320, source lines 315, and switching elements 325 may be located on two or more different layers that are stacked to form the display device 300. Because the layer that includes the source lines 315 now has the free routing channels 330, these free regions may be used to add the conductive routing traces 335 to the display device 300. The conductive routing traces 335 may then be coupled to the sensor electrodes 120 discussed in FIGS. 1 and 2. Specifically, the conductive routing traces 335 may be used to carry the capacitive sensing signals (e.g., the modulated signal, the transmitter and/or resulting signals) to and from the sensor electrodes 120. This routing of signals may be performed within the free channel regions 330, and thus, avoid adding a different layer to the display device 300.

While the embodiment shown in FIG. 3 uses a dual-gate configuration as described above, it should be recognized that the conductive routing traces may be placed on other layers of the input device 100, including an additional routing layer in the display or input device, and a back side (or even same side) of the substrate that the sensor electrodes 120 are disposed on.

Figure 4:
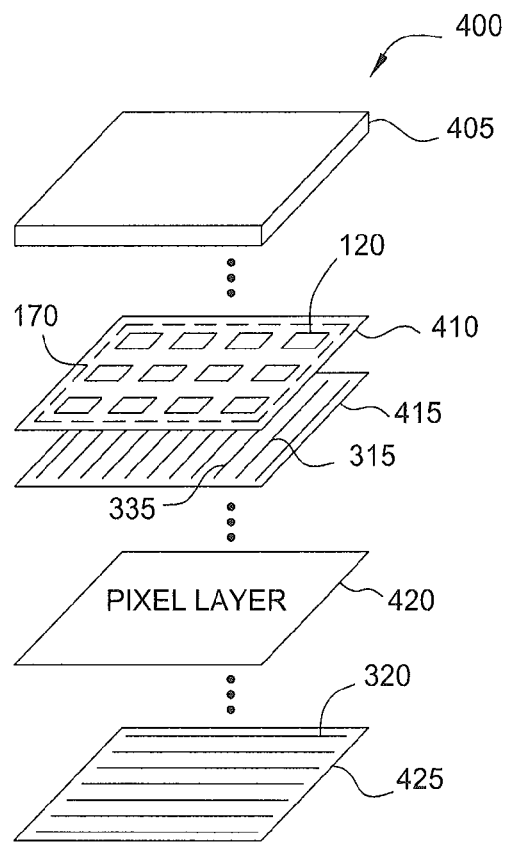
FIG. 4 illustrates a display panel with an integrated capacitive sensing matrix, according to one embodiment described herein.

FIG. 4 illustrates a display panel 400 with an integrated capacitive sensing matrix, according to one embodiment described herein. Panel 400 includes a glass layer 405 which may serve as an outer layer of the panel 400. Although this layer 405 is specifically disclosed as glass, layer 405 may include any transparent material—e.g., a plastic or polymer. In one embodiment, glass layer 405 may be a protective upper layer of the panel 400. Although not shown, additional layers may be added onto the glass layer 405 when manufacturing a display device.

Layer 410 includes transparent electrodes 120 which may define the capacitive sensing region 170. As such, the capacitive sensing elements uses to detect the proximity on an input object relative to the display panel 400 may be integrated within the display panel instead of, for example, being laminated on top of the panel 400—e.g., fabricated on the upper surface of glass layer 405. Layer 410 may be directly beneath the glass layer 405 or one or more layers may separate the layers 405 and 410 within the display panel 400.

In one embodiment, layer 410 may be used when updating the display and when performing capacitive sensing—i.e., the sensing electrodes 120 are common electrodes as described above. In one embodiment, the sensing electrodes 120 include all the common electrodes in the layer 410. During display updating, the sensor electrodes 120 may be coupled to the sub-pixels 310 shown in FIG. 3 to serve as the reference voltage (e.g., ground or Vcom) when setting the voltage across the sub-pixels 310. During capacitive sensing, however, the capacitive sensing signals may be driven onto the sensor electrodes 120 in order to detect input objects. In one embodiment, layer 410 may be a Vcom electrode layer that is patterned into the sensor electrodes 120 in order to serve the dual purpose described above. In other embodiments, the sensor electrodes 120 may be integrated into other layers of the display panel 400, e.g., such as the layer that forms the gate electrodes. Thus, in order to integrate the capacitive sensing electrodes 120 into a display panel 400, additional thickness is not added to the panel 400 relative to a display panel that does not contain capacitive sensing elements.

Display panel 400 includes a source line layer 415 which routes the various source lines 315 for driving voltages onto the pixels in the panel 400. As shown, layer 415 also includes the conductive routing traces 335 which may be interleaved with the source lines 315. Although not shown, display panel 400 may include respective vias that couple the conductive routing traces 335 on layer 415 to one of the sensor electrodes 120 in layer 410. Although FIG. 4 illustrates that the source line layer 415 directly contacts layer 410, this is not a requirement. For example, the vias may extend through multiple layers in order to electrically connect the conductive routing traces 335 to the sensor electrodes 120.

Pixel layer 420 may include the pixels 305 shown in FIG. 3. That is, the material used to form the pixels (e.g., liquid crystal, emissive electroluminescent material, etc.) may be placed on layer 420. As such, the panel 400 may include vias that couple the pixels in layer 420 to the source lines 315 in layer 415.

Display panel 400 may include a gate line layer 425 which includes a plurality of gate lines 320 for electrically coupling the source lines 315 to the pixels in the pixel layer 420. As such, panel 400 may include vias that couple the gate lines 320 to switching elements (not shown) in the pixel layer 420. Moreover, the layers, as well as their order, shown in FIG. 4 are for illustration purposes only and are not intended to limit the different display panels which may be used with the embodiments presented herein. For example, the display panel 400 may include more or less than the layers shown, or the display panel 400 may order the layers differently. In other embodiments, the input device may include sensor electrodes that are discrete and separated from the display panel 400.

Sensor Module for Sensing Active Pen

Figure 5:
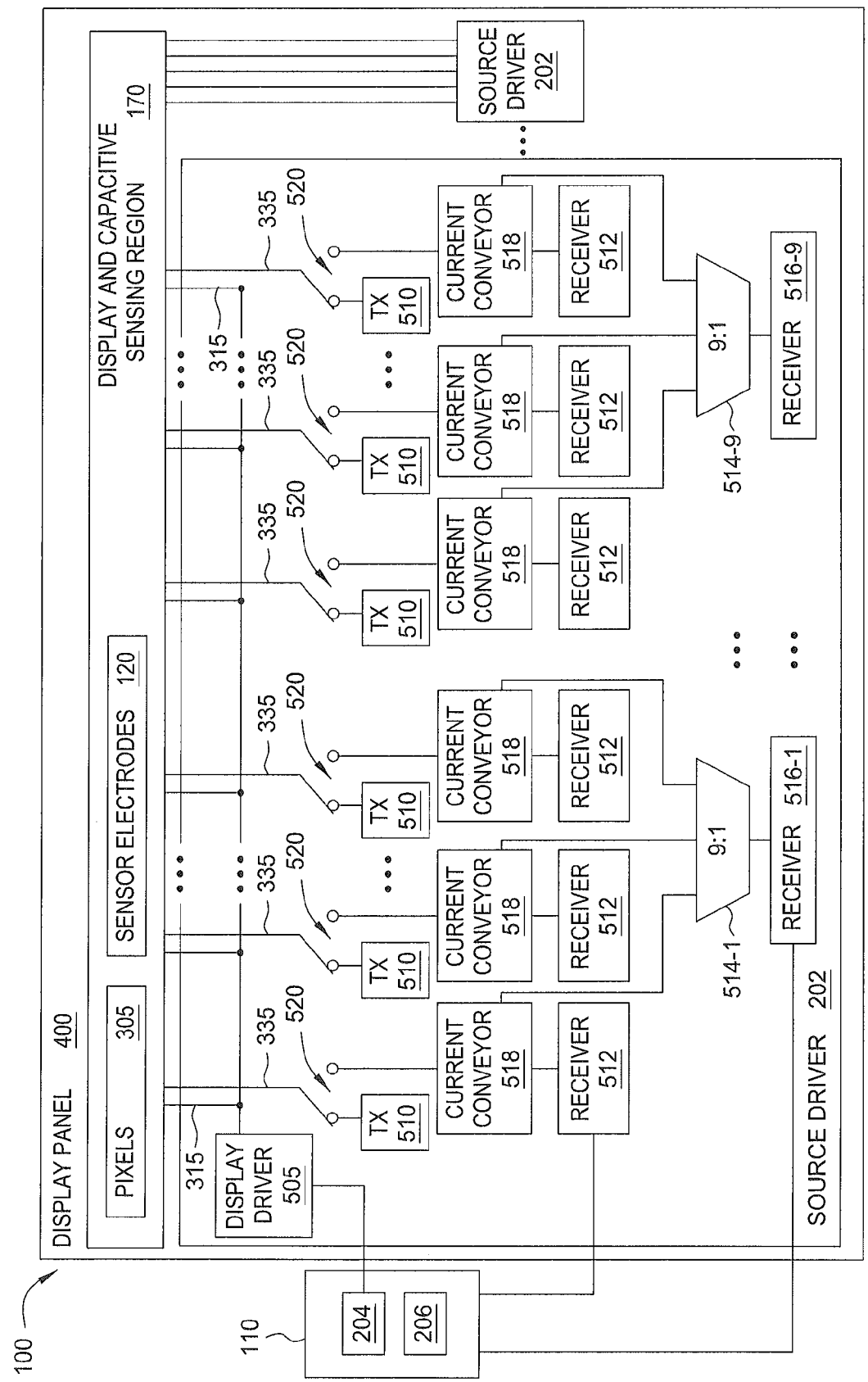
FIG. 5 illustrates an input device with a source driver attached to a display panel for performing display updating and capacitive sensing, according to one embodiment described herein.

FIG. 5 illustrates an input device 100 attached to the display panel 400 for performing display updating and capacitive sensing, according to one embodiment described herein. As shown, the input device 100 includes a plurality of source drivers 202 configured to generate signals to drive pixel elements and display electrodes of the input device 100 for display. In some embodiments, the source driver 202 is directly mounted on the display panel 400. For example, the source drivers 202 may be attached to the glass layer 405 shown in FIG. 4. Although input device 100 includes multiple source drivers 202, in other embodiments, only one source driver 202 may be used. The source drivers 202 includes a display driver 505 that provides an interface for driving the sources lines 315 for updating the voltage stored across the pixels 305 in a display and capacitive sensing region 170 of the panel 400. In one embodiment, the display driver 505 may receive digital display data from the display driver module 204 of the processing system 110 (e.g., via a high-speed serial connection), de-serialize the data (i.e., convert to parallel), and drive desired analog voltages onto the sources lines 315 to provide an image to the user.

In the particular embodiment shown in FIG. 5, the receivers of the sensor module 206 may be integrated into one or more source drivers 202 that are coupled to the sensor electrodes 120, although the receivers of the sensor module 206 may be part of other components, e.g., processing system 110 or other discrete component. In one or more embodiments, the source drivers 202 include a plurality of transmitters 510, a first plurality of receivers 512, current conveyors 518, and a second plurality of receivers 516. To measure a capacitance associated with a sensor electrode 120, switching elements 520 may electrically couple the conductive routing traces 335 to receivers 512, 516. For example, when measuring absolute capacitance, a sense line 335 may be coupled to one of the receivers 512. In another example, when performing transcapacitance, a first sense line 335 may be coupled a transmitter 510 while a second sense line 335 is coupled a receiver 512. The transmitters 510 may be drivers that generate the transmitter signals on one of the conductive routing traces 335. In turn, the conductive routing traces 335 provide a signal path for the transmitter signal to reach one of the sensor electrodes 120. While the first sense line 335 provides the transmitter signal to one sensor electrode 120, the second sense line 335 transmits the resulting signal indicative of the coupling capacitance between the two sensor electrodes 120 to the receiver 512. In this manner, the conductive routing traces 335 may be used to both carry the modulated or transmitter signals from a transmitter 510 to a sensor electrode 120 as well as carry a resulting signal from a sensor electrode 120 to the receiver 512.

In the embodiment shown in FIG. 5, switching elements 520 may electrically couple the conductive routing traces 335 to current conveyors 518 configured to generate replicated signals based on resulting signals received from the sensor electrodes 120. The current conveyors 518 allow for multiple identical outputs from the first stage amplifier/attenuator which can be used for different modes of capacitive sensing in overlapping time periods. One output is coupled to the receivers 512, and the other output is coupled to the receivers 516 (e.g., 516-1, 516-2, . . . 516-9) via multiplexors 514 (i.e., muxes). Each multiplexor 514 is associated with a receiver 516 and is configured to select a sensor electrode from each associated set of sensor electrodes.

When performing capacitive sensing of an active pen at a location, a sense line 335 may be electrically coupled to a receiver 516 using a multiplexor 514 to select the sense line 335 corresponding to a sensor electrode 120 that is proximate to the location of the active pen. For example, one sensor electrode 120 may be selected from each multiplexor 514 to define a tracking window for sensing the presence of the active pen 142. The size of the tracking window for sensing the active pen 142 may be based on the number of receivers 516. For example, nine multiplexors 514 associated with nine receivers 516 may be used to define a tracking window comprised of nine sensor electrodes, such as in a 3×3 square pattern. It should be recognized that the sensor module 206 may include any number of receivers 516 configured for sensing the active pen according to techniques described herein.

The receivers 512, 516 may include an analog-to-digital converter (ADC) for converting the measured capacitance into a digital signal, which may be provided to the processing system 110. In one embodiment, the receivers 512, 516 may serialize the digital data output from the respective ADCs and use a high-speed serial connection to transmit the data to the processing system 110. Although not shown in FIG. 5, the transmitters 510, receivers 512, 516, multiplexors 514, and switching elements 520 may be controlled by signals received from the processing system 110.

Although the embodiment shown in FIG. 5 has each sense line 335 associated with a respective receiver 512, other embodiments are contemplated that use a set of multiplexers (i.e., in addition to multiplexers 514) to reduce the number of receivers 512 and other capacitive sensing circuitry that may otherwise be included in the source driver 202. In such embodiments, the source driver would permit, for example, four different conductive routing traces 335 to be coupled to the same receiver 512 via a 4:1 multiplexer (though any number of sense lines could be multiplexed into a shared receiver 512) and four touch cycles would be needed to obtain a capacitive measurement for all sensor electrodes in the input device, e.g., using a 2×2 tracking pattern.

Further, embodiments described herein may use a single source driver 202 or multiple source drivers 202. In other embodiments, the display panel 400 may be divided in a "divided screen" configuration with a separate source driver 202 dedicated to a division of the display panel 400. In such an embodiment, multiple sets of receivers 516 for sensing an active pen may be used, which can advantageously reduce maximum wire length needed in the input device.

Further, while the embodiment shown in FIG. 5 includes separate groups of receivers 512 and receivers 516 for sensing the active pen 142 in a tracking window without pausing capacitive sensing across the input device 100, in some alternative embodiments, the second group of receivers 516 may be time-multiplexed to obtain resulting signals comprising effects corresponding to the active pen 142 and then to obtain resulting signals comprising effects corresponding to the presence of other input objects 140.

Figure 6A:
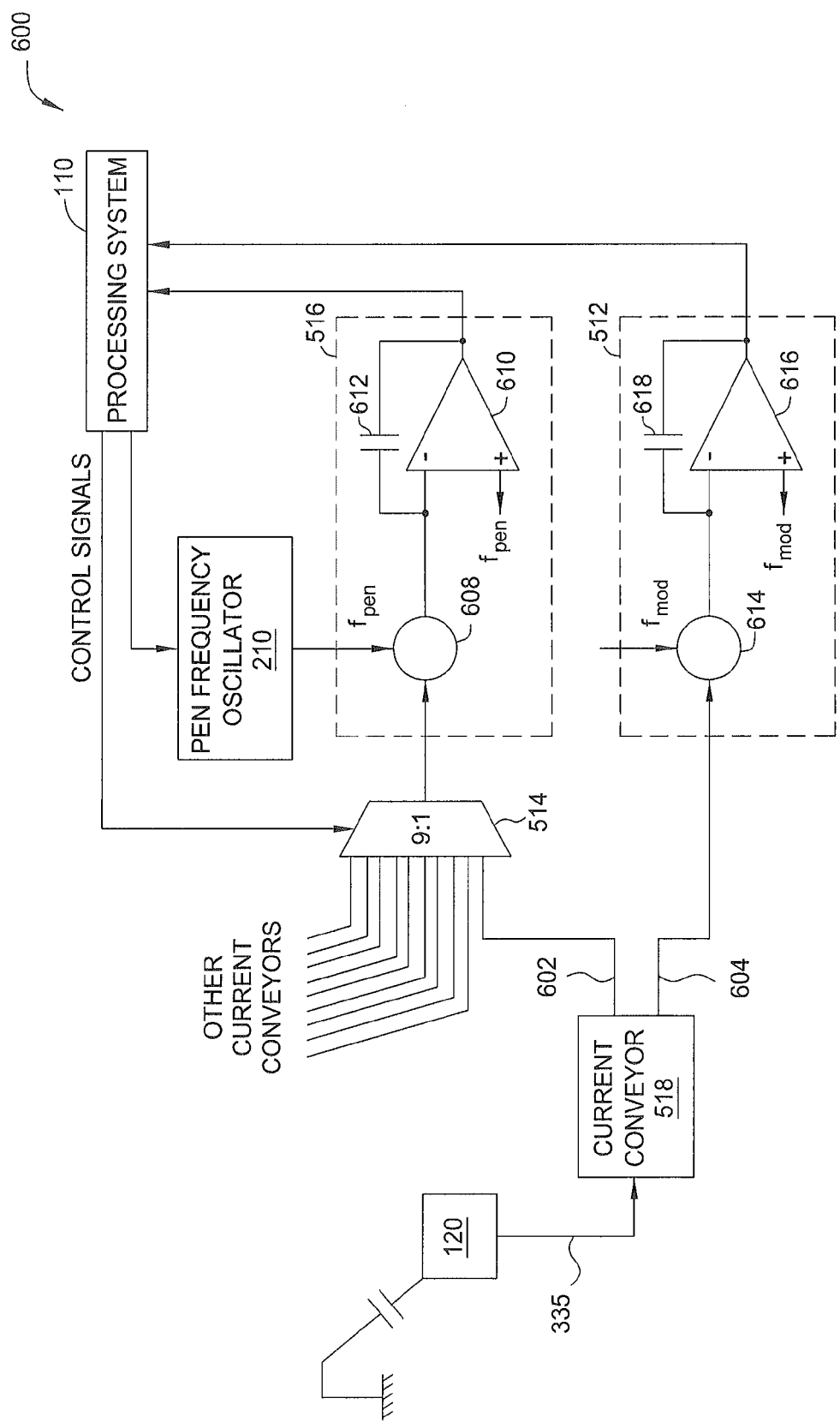
FIG. 6A is a schematic block diagram of capacitive sensing circuitry for receivers, according to one embodiment described herein.

FIG. 6A is a schematic block diagram of capacitive sensing circuitry for receivers 512, 516, according to one embodiment of the present disclosure. As mentioned above, a current conveyor 518 provides multiple identical outputs for the receivers 512, 516 based on the resulting signals comprising effects corresponding to input objects in the sensing region 170. As shown, the current conveyor 518 provides a first signal 604 (i.e., flow of charge) to the receiver 512 and a second signal 602 to a multiplexor 514. The multiplexor 514 is electrically coupled to other current conveyors 518 which may be electrically coupled to other sensor electrodes of the same set, for example, all sensor electrodes of the set with the "(1)" designation depicted in FIG. 2.

When operating in a first mode according to absolute sensing techniques, a mixer 614 or synchronous demodulator filters and demodulates the signal 604 based on a modulated signal having a frequency $f_{mod}$. In some embodiments, the modulated signal may be a modulated reference signal provided the modulated power supply 212. A positive terminal on an integrator 616 in the receiver 512 may be driven with the modulated signal having the frequency $f_{mod}$. The negative terminal on the integrator 616 may be coupled to the filtered signal 604 and a feedback loop of the integrator 616 with a feedback capacitor 618. Based on the modulating positive terminal, the receiver 512 measures the capacitance between the sensor electrode 120 coupled to the sense line 335 and an input object. Using this measurement, the processing system 110 may determine if an input object is proximate to the sensor electrode 120. In other embodiments, the modulated signal may be applied to a negative terminal of the integrator instead of the positive terminal.

When operating to sense an active pen 142, the processing system 110 may transmit control signals to the multiplexor 514 to select the sensor electrode 120 from the set of sensor electrodes associated with the receiver 516. The multiplexor 514 may couple the output signal 602 to a mixer 608 or synchronous demodulator which filters and demodulates the output signal 602 based on a modulated signal having a frequency $f_{pen}$ associated with the active pen 142. A positive terminal on an integrator 610 in the receiver 516 may be driven with a modulated signal having a frequency $f_{pen}$. The negative terminal on the integrator 610 may be coupled to the filtered signal 602 and a feedback loop of the integrator 610 with a feedback capacitor 612. Based on the modulating positive terminal, the receiver 516 measures the capacitance between the sensor electrode 120 coupled to the conductive routing traces 335 and the active pen 142 effectively transmitting a charge through the capacitive coupling.

In some embodiments, the sensor module 206 is configured to demodulate the resulting signals based on a modulated signal having a same or substantially similar frequency $f_{pen}$ as the active pen signal transmitted by the active pen 142 in proximity to the input device. The processing system 110 may control the pen frequency oscillator 210 (e.g., via control signals) to provide a modulated signal with a selected frequency $f_{pen}$ that matches the active pen signal for demodulating the signal 602. In one or more embodiments, the mixer 608 may be configured to demodulate the signal 602 based on a frequency $f_{pen}$ different from the frequency $f_{mod}$ used for capacitive sensing in the first mode of operation. In some embodiments, the frequency $f_{pen}$ used for sensing the active pen 142 may be higher than the frequency $f_{mod}$ such that the receivers of the input device may distinguish between signals comprising effects corresponding to the active pen 142 and effects corresponding to other input objects. In some embodiments, the frequency $f_{pen}$ used for sensing the active pen 142 may be substantially orthogonal to the frequency $f_{mod}$ used for capacitive sensing in the first mode of operation. In one example, the receivers 512 may be configured to demodulate resulting signals based on a modulated reference signal of 100 kHz, while the receivers 516 associated with the active pen 142 may be configured to operate at a higher frequency of 450 kHz.

Figure 6B:
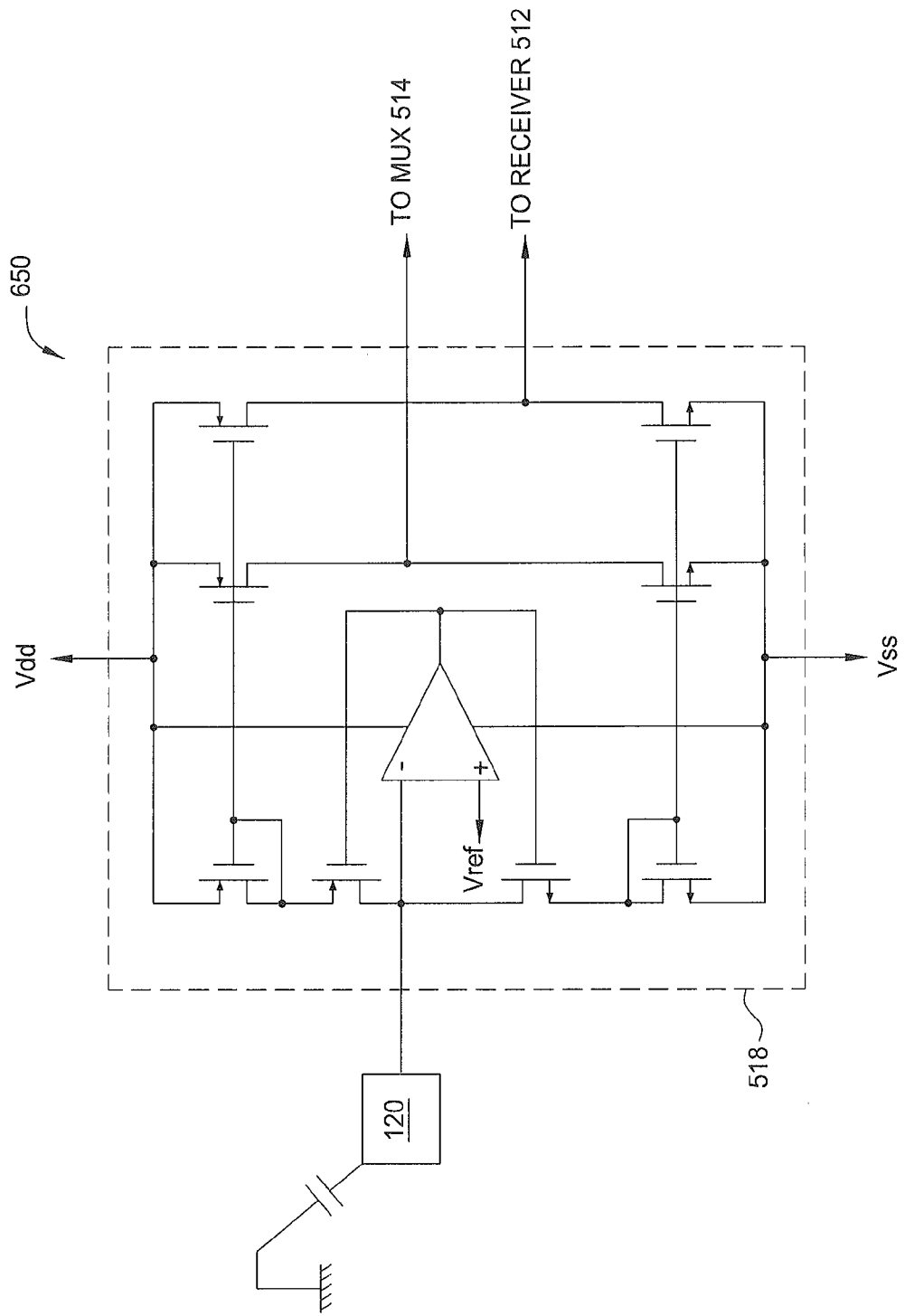
FIG. 6B is a schematic block diagram illustrating circuitry of a current conveyor in greater detail, according to one embodiment described herein.

FIG. 6B is a schematic block diagram depicting exemplary circuitry 650 of a current conveyor 518 in greater detail, according to one embodiment of the present disclosure. As shown, the current conveyor circuitry 650 includes an amplifier that provides, as an output, a reference signal that can be used to generate a replicated current to what the output is. In one embodiment, a negative terminal on the amplifier may be driven with the resulting signals received from a sensor electrode 120. The positive terminal on the amplifier may be coupled to a reference voltage (e.g., $V_{ref}$). A first output of the circuitry 650 may be electrically coupled to the integrator 616 of the receiver 512, and the other output of the circuitry 650 may be electrically coupled to a multiplexor 514 and the receiver 516 configured for a higher active pen signal frequency. The current conveyor 518 advantageously allows the input device 100 to perform capacitive sensing for the active pen 142 in an overlapping time period as capacitive sensing for other input objects 140.

While FIGS. 6A and 6B depicts an embodiment of receivers 512, 516 having current conveyors 518, it has been contemplated that other embodiment may be used without current conveyors 518. In such other embodiments, the current conveyors 518 may be replaced with a multiplexor configured to perform time-multiplexing between capacitive sensing of an active pen based on a higher pen frequency (e.g., using receivers 516), and capacitive sensing of input objects based on a lower frequency (e.g., using receivers 512). In yet another embodiment, the current conveyors 518 may be replaced with a high-speed current splitter configured to quickly split current between the different receiver channels.

Figure 7A:
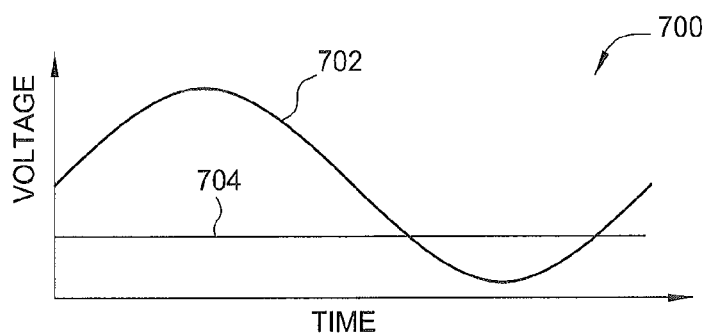
FIG. 7A illustrates a graph depicting operation of a conventional input device with input sensing and pixel updating occurring simultaneously without a modulated power supply.

FIG. 7A illustrates a graph 700 depicting operation of a conventional input device with input sensing and pixel updating occurring simultaneously without a modulated power supply. As can be seen by $V_{COM}$ graph 702, while the voltage for $V_{COM}$ is varying over time, the voltage at the pixel electrode, indicated by pixel electrode graph 704, stays constant. Because the voltage for $V_{COM}$ is varying, the voltage difference between the pixel electrode and the $V_{COM}$ electrode varies over time, which means that the desired voltage differential across the display material (e.g., liquid crystal material) is not being applied. This graph 700 illustrates the reason why pixel updates and input sensing traditionally has not been performed at the same time. A different scheme, depicted in FIG. 7B, allows pixel updates and input sensing to be performed at the same time, i.e., in overlapping time periods.

Figure 7B:
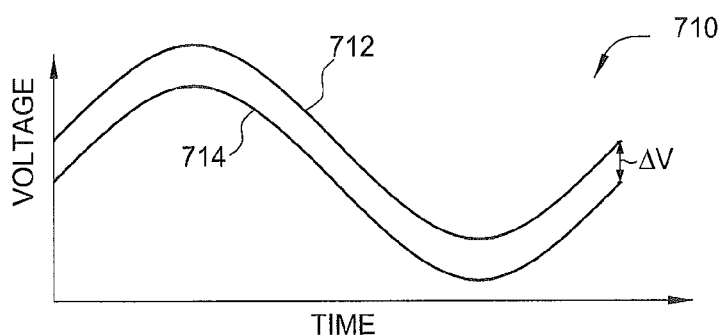
FIG. 7B illustrates a graph depicting operation of an input device with input sensing and pixel updating occurring simultaneously, utilizing a modulated power supply.

FIG. 7B illustrates a graph 710 depicting operation of an input device with input sensing and pixel updating occurring simultaneously, utilizing a modulated power supply. As can be seen, both the graph for $V_{COM}$ signal 712 and the graph for the pixel electrode signal 714 vary with time. Additionally, the voltage differential (indicated by $\Delta V$) between the pixel electrode 714 and $V_{COM}$ 712 remains substantially constant.

Because the voltage on $V_{COM}$ signal varies over time, the $V_{COM}$ signal can be used to detect capacitive coupling between $V_{COM}$ and an input object 140. More specifically, the varying voltage of $V_{COM}$ with respect to an input object 140 will induce an amount of current flow in common electrodes that can be measured. Although the voltage of the pixel electrode signal 714 is varying over time with respect to earth ground, the voltage differential between the pixel electrode signal 714 and $V_{COM}$ 712 signal remains substantially constant. Thus, a constant voltage differential is applied across the display material (e.g., liquid crystal material), which means that the liquid crystal material is able to be adjusted to a desired transmissivity. Any voltage differential between the pixel electrode and $V_{COM}$ may be selected. As long as this voltage differential remains substantially constant, a desired value is applied to the sub-pixel element.

Further, as illustrated by FIGS. 7A-7B, the $V_{COM}$ signal is modulated to use common electrodes as sensor electrodes. This means that in many embodiments, updating the pixel values cannot be done at the same time that the input object is sensed. However, by modulating the power supply, $V_{COM}$ is modulated with respect to earth ground, and is held constant with respect to the voltage applied to a sub-pixel 310, which is also modulated. Further, by modulating the power supply, conductive elements within pixels of the display device are modulated as well, which means that parasitic capacitance between $V_{COM}$ and these conductive elements is reduced as compared with an input device 100 that does not include a modulated power supply. Further, because the $V_{COM}$ signal is modulated, sub-pixel values can be updated at the same time that the input object is sensed.

Figure 7C:
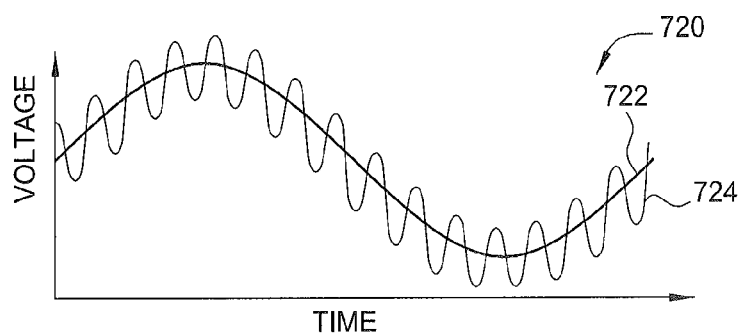
FIGS. 7C and 7D illustrate graphs depicting operation of an input device with capacitive sensing and active pen sensing occurring simultaneously, utilizing a modulated power supply, according to one embodiment described herein.
Figure 7D:
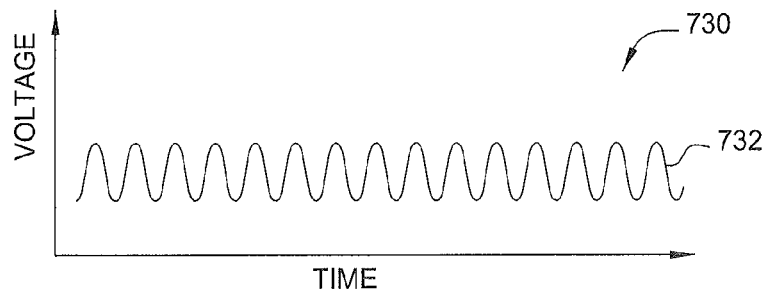

FIGS. 7C and 7D illustrate graphs 720, 730 depicting operation of an input device with capacitive sensing and active pen sensing occurring simultaneously, utilizing a modulated power supply. As can be seen in graph 720, the modulated signal 724 used for sensing the active pen may have a higher frequency relative to the frequency for the modulated signal 722 used for capacitive sensing of other input objects. When performing capacitive sensing of an active pen, the synchronous demodulators of receivers 516 may separate out the frequency of the active signal from the modulation frequency used for absolute capacitance sensing, and generate a resulting signal 732 shown in graph 730 comprising effects corresponding to the active pen 142 transmitting an active pen signal.

Figure 8:
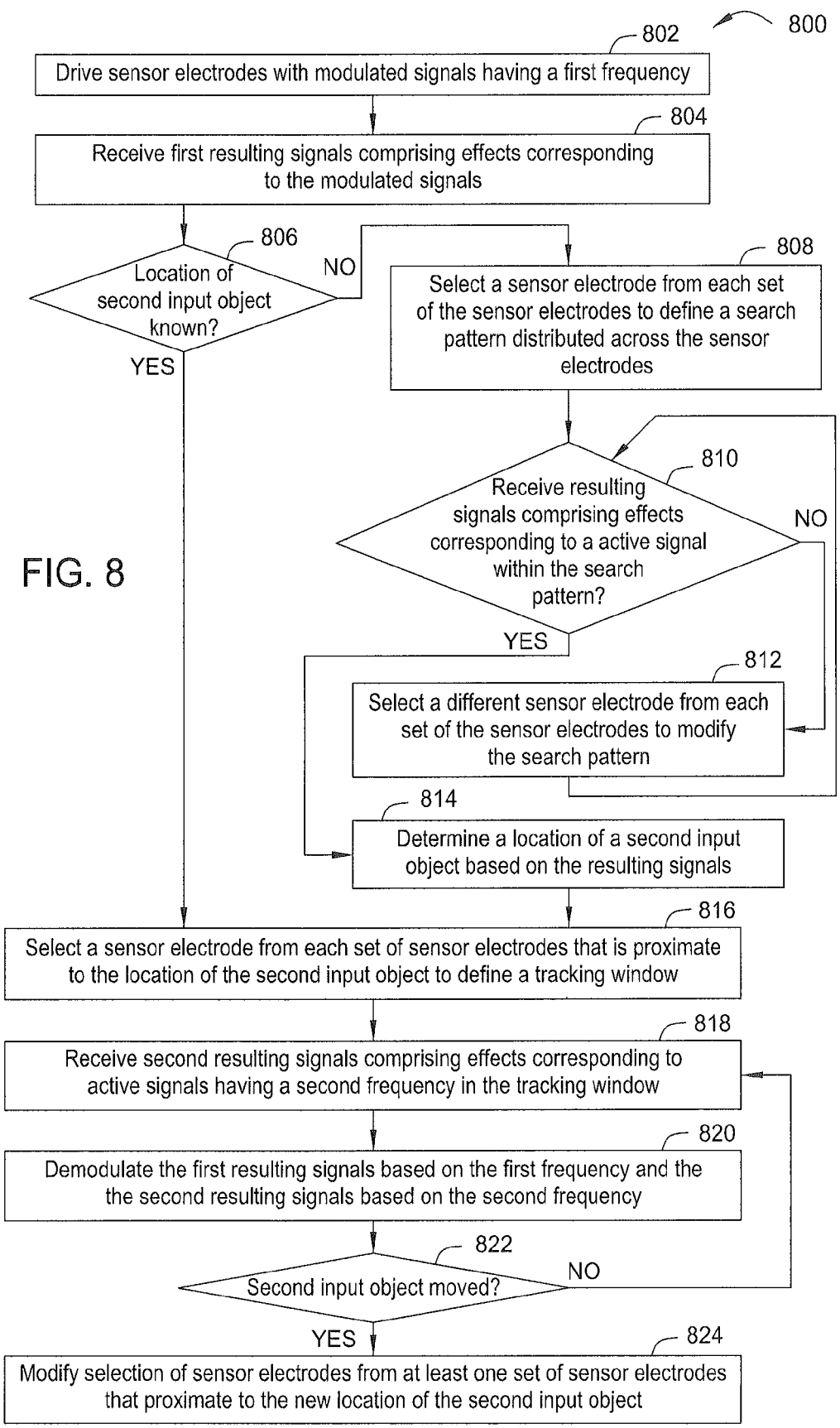
FIG. 8 is a flow diagram of one embodiment of a method for detecting presence of an actively modulated input object.

FIG. 8 is a flow diagram depicting a method 800 for detecting presence of an actively modulated input object (e.g., active pen 142), according to one embodiment of the present disclosure. The method 800 begins with the processing system 110 operating the input device 100 in a first mode for capacitive sensing using the sensor electrodes 120, as described above. At step 802, the processing system 110 may drive the plurality of sensor electrodes 120 with modulated signals having a first frequency. At step 804, the processing system 110 may receive first resulting signals at a first receiver (e.g., receiver 512) comprising effects corresponding to the modulated signals.

In one or more embodiments, the processing system 110 may then operate the input device in another mode for sensing a second input object, specifically, an actively modulated input object (e.g., active pen 142). It has been contemplated that, in some embodiments, that the processing system 110 may perform sensing for the second input object without pausing the capacitive sensing (e.g., as performed in steps 802 and 804), and, in other embodiments, the sensor electrodes 120 may be time-multiplexed to perform capacitive sensing (e.g., as in steps 802 and 804), pause the capacitive sensing, and then perform sensing for the active pen.

At step 806, the processing system 110 may determine whether a location of the second input object is known. In some embodiments, a record of past locations of a second input object may be tracked and maintained within the processing system 110. In some embodiments, knowledge of the location of the second input object may be subject to a timer, expiry of which results in invalidation of the known location.

If the location is known, at step 816, the processing system 110 may select a sensor electrode, which is proximate to the location of the second input object, from a set of the sensor electrodes associated with a second receiver (e.g., receiver 516) to define part of a tracking window for tracking movement of the second input object. In some embodiments, the processing system 110 may operate one or more multiplexors 514 to electrically couple a sensor electrode from each set of sensor electrodes to an associated receiver 516. The processing system 110 may select sensor electrodes from each set of sensor electrodes according to one or more patterns, an example of which is shown in FIG. 9.

Figure 9:
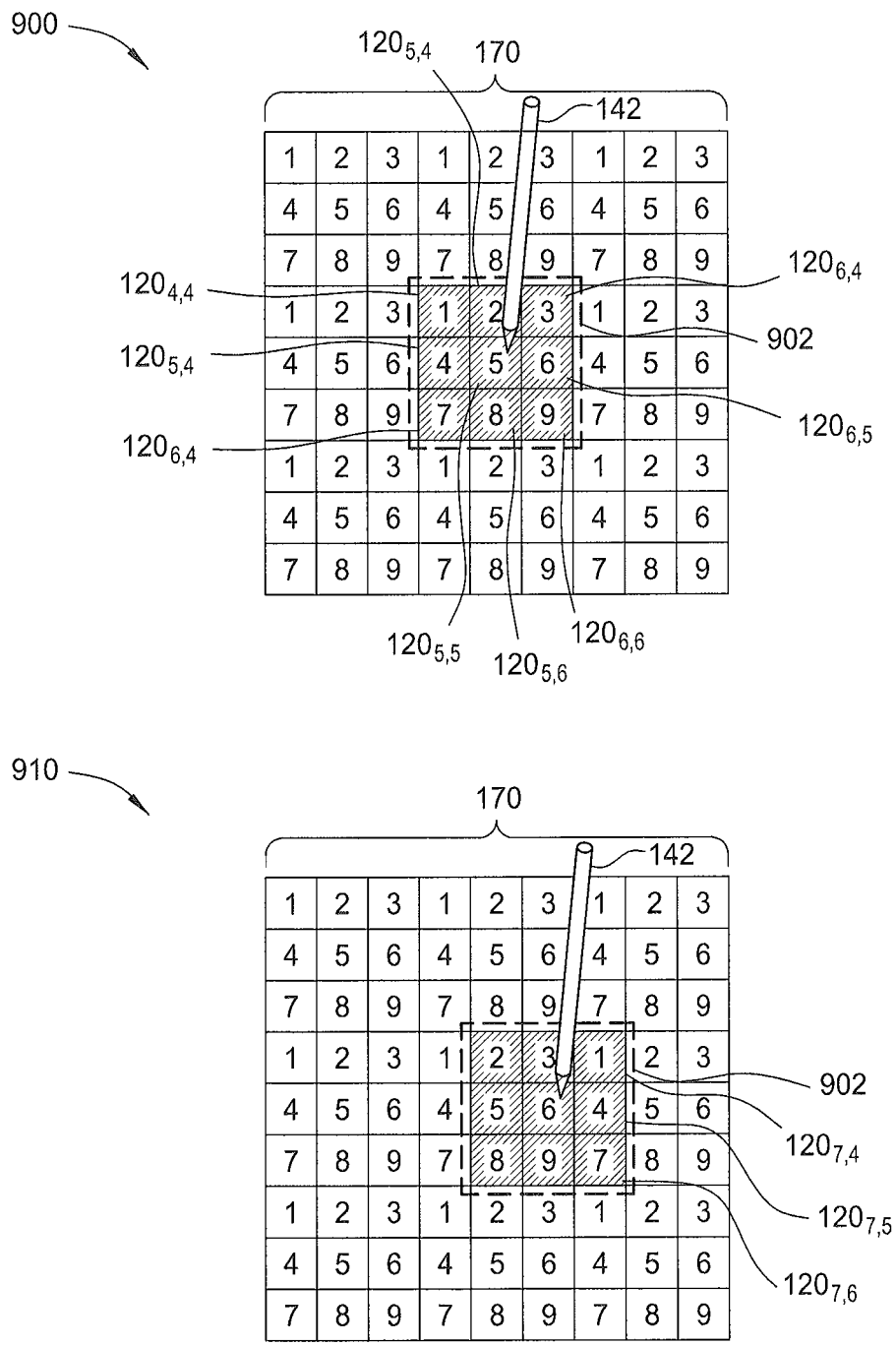
FIG. 9 illustrates developing a capacitive image by selecting a subset of the electrodes in a capacitive sensing region, according to one embodiment described herein.

FIG. 9 illustrates developing a capacitive image or profile of an active pen 142 by selecting a subset of the sensor electrodes 120 in the capacitive sensing region 170 to form a smaller capacitive sensing region referred to herein as a tracking window 902, according to one embodiment described herein. Specifically, FIG. 9 illustrates two different states 900, 910 of the tracking window 902 during two touch cycles. As used herein, a touch cycle is the time needed by the input device to measure a capacitance value for at least one electrode in the capacitive sensing region 170. For sake of illustration, the active pen 142 is not shown to scale.

State 900 illustrates that, during a first touch cycle, the input device selects one sensor electrode 120 from each set of sensor electrodes (e.g., sets 1-9) to form the tracking window 902 based on the location of the active pen 142. For example, the input device may select the sensor electrode $120_{5,5}$ from set 5 because the location of a pen tip or other end of the active pen 142 is proximate to that sensor electrode. The input device may further select the neighboring sensor electrodes adjacent to the sensor electrode $120_{5,5}$ to form the tracking window 902. Specifically, the input device selects the sensor electrode $120_{4,4}$ from set 1, sensor electrode $120_{5,4}$ from set 2, sensor electrode $120_{6,4}$ from set 3, sensor electrode $120_{4,5}$ from set 4, sensor electrode $120_{6,5}$ from set 6, sensor electrode $120_{4,6}$ from set 7, sensor electrode $120_{5,6}$ from set 8, and sensor electrode $120_{6,6}$ from set 9.

As discussed above, during capacitive sensing of the active pen 142, the input device may drive a modulated signal onto the selected sensor electrodes and measure the capacitance between each of the selected sensor electrodes and the active pen 142 as the active pen 142 transmits a charge to the selected sensor electrodes through a capacitive coupling. Accordingly, embodiments described herein provides reduced multiplexing for capacitive sensing the active pen compared to traditional capacitive sensing techniques which might require multiplexing, e.g., twenty sensor pads at a time, through multiple touch cycles to acquire a complete capacitive image of the sensing region 170. In contrast, embodiments described herein fully couple the receivers 516 once the tracking window 902 is set, and need not change the multiplexers unless the tracking window 902 moves. Accordingly, the input device is afforded more time for capacitive sensing and may use higher frequencies to capture a capacitive image of the active pen 142

Referring back to FIG. 8, at step 818, the processing system 110 may receive at a second receiver (e.g., receiver 516) second resulting signals comprising effects corresponding to active signals having a second frequency in the tracking window. At step 820, the processing system 110 may demodulate the first resulting signals based on the first frequency of the modulated signals and demodulate the second resulting signals based on the second frequency of the active pen signal.

At step 822, the processing system 110 determines whether the second input object has moved from a previous known location to a second location. If not, the processing system 110 may loop to step 818 and continue to receive resulting signals from the selected sensor electrodes corresponding to the second input object. Otherwise, at step 824, the processing system 110 may modify the selection of sensor electrodes from at least one set of the sensor electrodes that are proximate to the second location of the second input object.

As shown in FIG. 9, state 910 illustrates a second touch cycle of the input device in which the active pen 142 has changed position, e.g., to a location proximate to the sensor electrode $120_{6,5}$. The input device may detect the change in location of the active pen 142 and modify the selection of sensor electrodes 120 to "move" the tracking window 902 based on the new location of the active pen. In some embodiments, the multiplexors 514 may be changed in a traveling window fashion to keep the tracking window 902 centered to the location of the active pen. For example, to effectively shift the tracking window 902 to the right, the input device may change the selection from the sensor electrodes of set 1 from the sensor electrode $120_{4,4}$ to sensor electrode $120_{7,4}$; of set 2, from sensor electrode $120_{4,5}$ to sensor electrode $120_{7,5}$; of set 3 from the sensor electrode $120_{4,6}$ to sensor electrode $120_{7,6}$.

Referring back to FIG. 8, if the location of the second input object is known, a search pattern may be used to locate an at least approximate location of the second input object. Responsive to determining the location of the second input object is not known, at step 808, the processing system 110 may select a sensor electrode from each set of the sensor electrodes 120 to define a search pattern distributed across the sensor electrodes 120. In one or more embodiments, the processing system 110 may further select a different frequency from the pen frequency oscillator 210 used to detect the active pen to account for pen drift.

At step 810, the processing system 110 may determine whether resulting signals were received from any of the selected sensor electrodes comprising effects corresponding to active signals within the search pattern. For example, the processing system 110 may detect resulting signals comprising effects corresponding to the second input object transmitting an active pen signal proximate to any of the locations within the distributed search pattern. If so, at step 814, the processing system 110 determines a location of the second input object based on the resulting signals, and proceeds to step 816 where the tracking window is focused on the determined location. In one embodiment, the processing system 110 may determine positional information for the second input object based on demodulation of the resulting signals received at step 810.

In one embodiment, the input device may use a low power search pattern in which one sensor electrode at a time is selected and attempted to detect an active pen. In such an embodiment, the input device cycles through all sensor electrodes in multiple touch cycles to find the active pen. In another embodiment, the input device may use a broad search pattern that uses multiple receivers 516 at once to determine the location of an active pen, an example of which is shown in FIG. 10.

Figure 10:
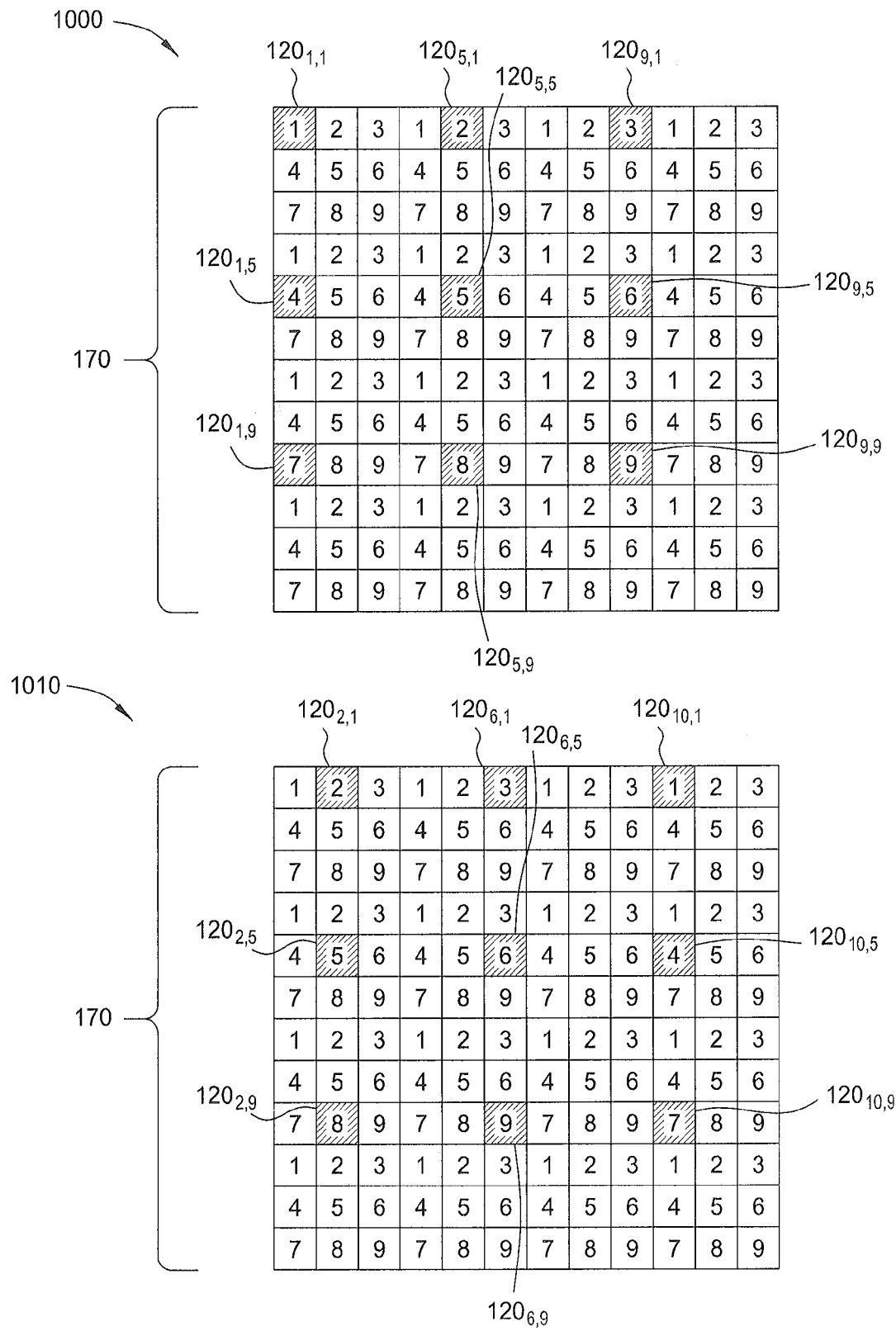
FIG. 10 illustrates developing the capacitive image for determining a location of an actively modulated input object in a capacitive sensing region, according to one embodiment described herein.

FIG. 10 illustrates developing a capacitive image or profile to determine a location of an active pen 142 in the capacitive sensing region 170, according to one embodiment described herein. Specifically, FIG. 10 illustrates two different states 1000, 1010 of a distributed search pattern during two touch cycles. State 1000 illustrates that, during a first touch cycle, the input device selects one sensor electrode 120 from each set of sensor electrodes (e.g., sets 1-9) to form a broad search pattern. For example, the input device may select the sensor electrode $120_{1,1}$ from set 1, sensor electrode $120_{5,1}$ from set 2, sensor electrode $120_{9,1}$ from set 3, sensor electrode $120_{1,5}$ from set 4, sensor electrode $120_{5,5}$ from set 5, sensor electrode $120_{9,5}$ from set 6, sensor electrode $120_{1,9}$ from set 7, sensor electrode $120_{5,9}$ from set 8, and sensor electrode $120_{9,9}$ from set 9.

The input device may drive a modulated signal onto the selected sensor electrodes of the search pattern and measure the capacitance between each of the selected sensor electrodes and the active pen 142, if present, as the active pen 142 transmits a charge to the selected sensor electrodes through a capacitive coupling. If any of the receivers 516 associated with the selected sensor electrodes detects the presence of the active pen 142, the input device may focus the tracking window 902 to the location of the detected presence. In some cases, the initial focus of the tracking window 902 may not be centered on the location of the active pen 142 at first, however it should be recognized that a nearby tracking window may provide sufficient detail and information for the input device to modify the selection of sensor electrodes and center the tracking window correctly (e.g., as in steps 822 and 824).

Referring back to FIG. 8, responsive to determining resulting signals were not received from an active pen in any of the selected sensor electrodes, at step 810, the processing system 110 may select a different sensor electrode from each set of the sensor electrodes to modify the search pattern and attempt to detect resulting signals again (e.g., step 810). In some embodiments, the processing system 110 may cycle a search pattern through the entire matrix of sensor electrodes in sequential touch cycles to find the active pen.

For example, as shown in FIG. 10, state 1010 illustrates a second touch cycle of the input device using a broad search pattern to locate the active pen 142. The input device may modify the selection of the sensor electrodes to step the search pattern across the matrix of sensor electrodes, although other sequences and/or patterns may be used.

Specifically, in the second touch cycle, the input device may change the selection from the sensor electrodes of set 1 from the sensor electrode $120_{1,1}$ to sensor electrode $120_{10,1}$; of set 2, from sensor electrode $120_{5,1}$ to sensor electrode $120_{2,1}$; of set 3 from the sensor electrode $120_{9,1}$ to sensor electrode $120_{6,1}$; of set 4, from sensor electrode $120_{1,5}$ to sensor electrode $120_{10,5}$; of set 5, from sensor electrode $120_{5,5}$ to sensor electrode $120_{2,5}$; of set 6, from sensor electrode $120_{9,5}$ to sensor electrode $120_{6,5}$; of set 7, from sensor electrode $120_{1,9}$ to sensor electrode $120_{10,9}$; of set 8, from sensor electrode $120_{5,9}$ to sensor electrode $120_{2,9}$; and of set 9, from sensor electrode $120_{9,9}$ to sensor electrode $120_{6,9}$. While FIG. 10 depicts a search pattern for locating an active pen in a matrix of sensor electrodes 120, it has been contemplated that the broad search pattern may be applied to other configurations and embodiments of capacitive sensing devices, such as input devices having a "bar-and-stripes" configuration.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. An input device comprising:
   a plurality of sensor electrodes organized into a plurality of sets; and
   a processing system configured to drive the plurality of sensor electrodes with modulated signals having a first frequency, wherein the processing system comprises:
      a first plurality of receivers coupled to the plurality of sensor electrodes, wherein the first plurality of receivers are configured to obtain first resulting signals comprising effects corresponding to the modulated signals;
      a second plurality of receivers, wherein each receiver of the second plurality of receivers is coupled to an associated set of the plurality of sensor electrodes and configured to obtain second resulting signals comprising effects corresponding to active signals having a second frequency, wherein the first plurality of receivers and the second plurality of receivers are disjoint sets of receivers; and
      a multiplexor coupled to the second receiver and to the associated set of the plurality of sensor electrodes associated with the second receiver, wherein the multiplexor is configured to select a sensor electrode from the associated set of sensor electrodes;
      wherein the processing system is configured to demodulate the first resulting signals based on the first frequency of the modulated signals and the second resulting signals based on the second frequency, wherein the second frequency is different than the first frequency, and is further configured to determine first positional information for a first input object based on the demodulation of the first resulting signals and second positional information for a second input object based on the demodulation of the second resulting signals.

2. The input device of claim 1, wherein the active signals are transmitted by an input object external to the input device.

3. The input device of claim 1, wherein the processing system is further configured to select one sensor electrode from each set of sensor electrodes that are proximate to a first location to define a tracking window for tracking movement of the second input object, and obtain from the selected sensor electrode the second resulting signals comprising effects corresponding to the second input object in the tracking window.

4. The input device of claim 3, wherein the processing system is further configured to, responsive to determining movement of the second input object to a second location, modify a selection of sensor electrodes based on the second location.

5. The input device of claim 3, wherein the processing system is further configured to select one sensor electrode from each set of sensor electrodes, wherein the selected sensor electrodes define a search pattern distributed across the plurality of sensor electrodes, and determine the first location of the second input object based on resulting signals obtained from the selected sensor electrodes associated with the second plurality of receivers.

6. The input device of claim 1, wherein the first plurality of receivers includes a first receiver and the second plurality of receivers include a second receiver, wherein the input device further comprises:
   a multiplexor coupled to the second receiver and to the associated set of the plurality of sensor electrodes associated with the second receiver, wherein the multiplexor is configured to select a sensor electrode from the associated set of sensor electrodes; and
   current conveyor circuitry coupled to the multiplexor and to the first receiver, wherein the current conveyor circuitry is configured to generate a first signal to the first receiver, and a second signal to the multiplexor associated with the second receiver based on the second resulting signals received from the plurality of sensor electrodes.

7. The input device of claim 1, further comprising:
   a modulated power supply configured to generate a modulated reference signal having the first frequency, wherein the second frequency of the active signals is higher than the first frequency of the modulated reference signal.

8. The input device of claim 1, wherein the input device comprises a display device having an integrated sensing device, wherein at least one sensor electrode of the plurality of sensor electrodes comprises a display electrode of the display device.

9. A processing system configured to drive a capacitive sensing device, the capacitive sensing device having a plurality of sensor electrodes organized into a plurality of sets, the processing system comprising:
   a sensor module configured to drive the plurality of sensor electrodes with modulated signals having a first frequency, the sensor module comprising:
      a first plurality of receivers coupled to the plurality of sensor electrodes, wherein the first plurality of receivers are configured to obtain first resulting signals comprising effects corresponding to the modulated signals, and
      a second plurality of receivers, wherein each receiver of the second plurality of receivers is coupled to an associated set of the plurality of sensor electrodes and configured to obtain second resulting signals comprising effects corresponding to active signals having a second frequency, wherein the first plurality of receivers and the second plurality of receivers are disjoint sets of receivers;
      wherein the sensor module is further configured to demodulate the first resulting signals based on the first frequency of the modulated signals and demodulate the second resulting signals based on the second frequency, wherein the second frequency is different than the first frequency, and
      wherein the sensor module is configured to determine first positional information for a first input object based on the demodulation of the first resulting signals and second positional information for a second input object based on the demodulation of the second resulting signals.

10. The processing system of claim 9, wherein the sensor module is further configured to select one sensor electrode from the associated set of sensor electrodes that are proximate to a first location to define a tracking window for tracking movement of the second input object, and to obtain from the selected sensor electrode the second resulting signals comprising effects corresponding to the second input object in the tracking window.

11. The processing system of claim 10, wherein the sensor module is further configured to, responsive to determining movement of the second input object to a second location, modify a selection from the associated set of sensor electrodes based on the second location.

12. The processing system of claim 10, wherein the sensor module is further configured to select one sensor electrode from the associated set of sensor electrodes, wherein the selected sensor electrode defines part of a search pattern distributed across the plurality of sensor electrodes, and to determine the first location of the second input object based on the second resulting signals obtained from the selected sensor electrode associated with a second receiver of the second plurality of receivers.

13. The processing system of claim 9, wherein the processing system further comprises a pen frequency oscillator configured to provide a second reference signal having the second frequency to the sensor module.

14. The processing system of claim 9, wherein the second plurality of receivers are configured to obtain the second resulting signals comprising effects corresponding to a second input object transmitting the active signals while the first plurality of receivers is obtaining the first resulting signals comprising effects corresponding to a first input object.

15. The processing system of claim 9, wherein the first plurality of receivers is configured to obtain and demodulate the first resulting signals based on the first frequency of the modulated signals during a first capacitive sensing period; and
wherein the second plurality of receivers is configured to obtain and demodulate the second resulting signals based on the second frequency of the active signals during a second capacitive sensing period.

16. A method for detecting presence of an input object using a capacitive sensing device, the capacitive sensing device having a plurality of sensor electrodes organized in a plurality of sots, the method comprising:
driving the plurality of sensor electrodes with modulated signals having a first frequency;
receiving first resulting signals at a first plurality of receivers comprising effects corresponding to the modulated signals;
receiving second resulting signals at a second plurality of receivers comprising effects corresponding to active signals having a second frequency, wherein the first plurality of receivers and the second plurality of receivers are disjoint sets of receivers; and
demodulating the first resulting signals based on the first frequency of the modulated signals and the second resulting signals based on the second frequency, wherein the second frequency is different than the first frequency; and
determining first positional information for a first input object based on the demodulation of the first resulting signals and second positional information for a second input object based on the demodulation of the second resulting signals.

17. The method of claim 16, further comprising:
selecting a sensor electrode, which is proximate to a first location, from a set of sensor electrodes associated with a second receiver of the second plurality of receivers to define part of a tracking window for tracking movement of the second input object; and
obtaining from the selected sensor electrode the second resulting signals comprising effects corresponding to the second input object in the tracking window.

18. The method of claim 17, further comprising:
responsive to determining movement of the second input object to a second location, modifying a selection from the associated set of sensor electrodes based on the second location.

19. The method of claim 17, further comprising:
selecting a second sensor electrode from the set of sensor electrodes associated with the second receiver, wherein the selected second sensor electrode defines part of a search pattern distributed across the plurality of sensor electrodes; and
determining the first location of the second input object based on third resulting signals obtained from the selected second sensor electrode.

20. The method of claim 16, wherein receiving and demodulating the first resulting signals the second resulting signals are performed during a single capacitive sensing period.

* * * * *

UNITED STATES PATENT AND TRADEMARK OFFICE
CERTIFICATE OF CORRECTION

PATENT NO. : 9,436,325 B2  
APPLICATION NO. : 14/137463  
DATED : September 6, 2016  
INVENTOR(S) : Stephen L. Morein et al.

Page 1 of 1

It is certified that error appears in the above-identified patent and that said Letters Patent is hereby corrected as shown below:

In the Claims

Column 27, Claim 16, Line 44, please delete the word "sots," and insert -- sets, -- therefor;

Column 28, Claim 16, Line 8, please delete the words "receivers; and" and insert -- receivers; -- therefor.

Signed and Sealed this  
Thirteenth Day of March, 2018

Andrei Iancu  
*Director of the United States Patent and Trademark Office*